Figure 4:
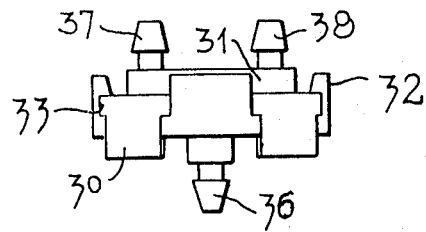

United States Patent [19]
Lemelshtrich

[11] 3,979,070
[45] Sept. 7, 1976

[54] DRIP OR TRICKLE EMITTER FOR USE IN DRIP OR TRICKLE IRRIGATION

[76] Inventor: Moshe Lemelshtrich, 100 Petah Tikva Road, Tel Aviv, Israel

[22] Filed: July 21, 1975

[21] Appl. No.: 597,914

Related U.S. Application Data

[63] Continuation-in-part of Ser. No. 561,978, March 25, 1975.

[30] Foreign Application Priority Data

Mar. 26, 1974 Israel.................................... 44502
Apr. 21, 1975 Israel.................................... 47127

[52] U.S. Cl. ............................................... 239/542
[51] Int. Cl.² ........................................... B05B 15/00
[58] Field of Search ........................... 239/542, 547; 138/42–46

[56] References Cited
UNITED STATES PATENTS

| | | | |
|---|---|---|---|
| 3,815,636 | 6/1974 | Menzel | 138/43 |
| 3,834,628 | 9/1974 | Selman | 239/542 |
| 3,882,892 | 5/1975 | Menzel | 239/542 X |
| 3,887,139 | 6/1975 | Pearce | 239/542 |

*Primary Examiner*—John J. Love
*Attorney, Agent, or Firm*—Browdy and Neimark

[57] ABSTRACT

The invention provides a device for use in irrigation, more particularly a drip or trickle emitter.

The new drip or trickle emitter is outwardly a plate shaped body in the interior of which a tortuous path is provided for the flow. The emitter is composed of two matingly fitted parts which are press fitted into one another.

7 Claims, 6 Drawing Figures

U.S. Patent  Sept. 7, 1976  Sheet 1 of 2  3,979,070
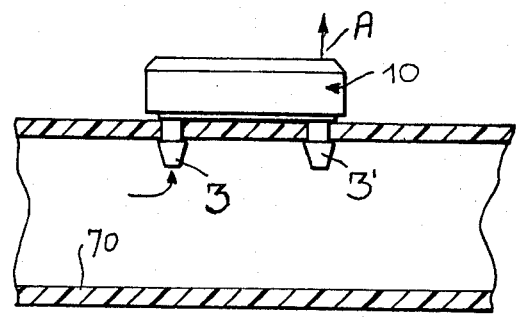
FIG. 1
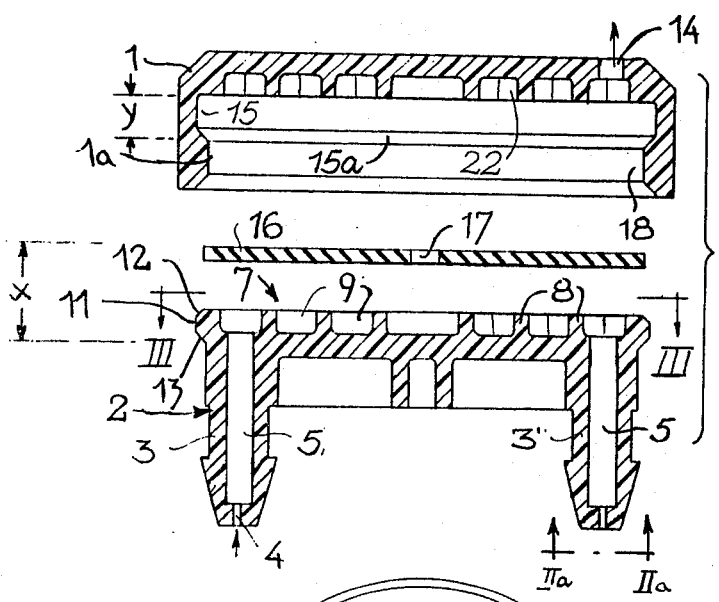
FIG. 2
FIG. 2a
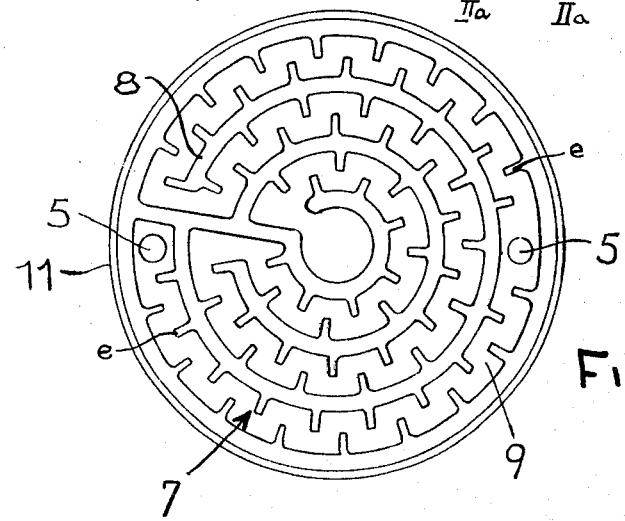
FIG. 3

DRIP OR TRICKLE EMITTER FOR USE IN DRIP OR TRICKLE IRRIGATION

CROSS REFERENCE TO RELATED APPLICATION

The present application is a continuation-in-part of U.S. application Ser. No. 561,978, filed Mar. 25, 1975, the entire contents of which are hereby incorporated by reference.

BACKGROUND OF INVENTION

The present invention relates to a drip or trickle emitter as used in drip or trickle irrigation. More particularly the invention relates to that type of drip or trickle irrigation device which consists of a plate like element in the interior of which a tortous path is provided for the flow. This plate like element is composed of two parts which matingly fit into or onto one another. Generally two parts of this kind are fused or welded together, thus forming a plate like element.

SHORT SUMMARY OF INVENTION

The present invention provides an especially advantageous form of such flow restrictor and trickle emitter, the plate like element being preferably a disc composed of two circular matingly connected co-axial parts, the said two parts being press fitted into one another for firm connection. Within the said disc shaped element the tortuous or meandering path for the flow is provided, the inlet connection into the emitter at one end of the said conduit and the outlet at the opposite end of the tortuous path.

A specific feature of the invention resides in the manner in which the two parts, which are press fittedly connected with one another, are maintained in the connected position due to a special arrangement and due to the shape of the connected parts at the contacting regions, urging one part into intimate contact with the other in axial direction.

Accordingly, there is provided a flow restrictor and trickle or drip emitter preferably having disc shape and defining in its interior a tortuous path, an inlet or inlets being provided leading at one or more points into the said tortuous path and an outlet or outlets at the end of the path, the two parts being matingly inserted into one another, means being provided urging the contacting regions of the two parts into forced intimate contact with one another in axial direction.

The said means may consist in oppositely directed shoulders on the two mating parts and a membrane extending over the whole area of the plate like element and dividing it into two chambers, the said membrane being clampingly held between the said two parts and exerting - due to its elasticity - pressure onto the said confronting shoulders. The membrane may be dispensed with if the material of at least one of the mating parts is sufficiently elastic.

SHORT DESCRIPTION OF DRAWINGS

Figure 5:
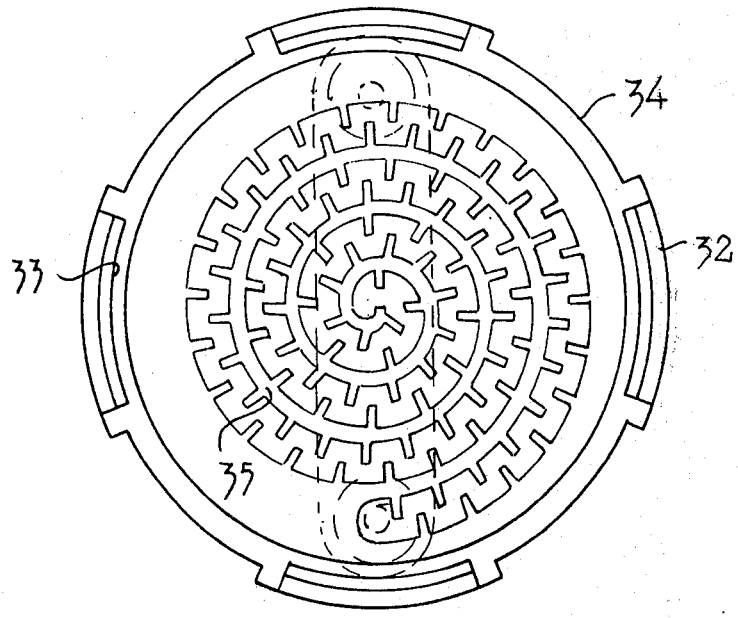

The invention will now be described with reference to the annexed drawings. In the drawings FIG. 1 shows the new trickle emitter in position on a water conducting hose. FIG. 2 is an exploded sectional view of the new emitter, FIG. 2a showing a detail, while FIG. 3 is a plan view of the main part of the emitter. FIG. 4 is an elevational view of an alternative form of the new emitter. FIG. 5 shows on a larger scale one of the complementary parts of the emitter of FIG. 4 illustrating the tortuous path within the device.

DESCRIPTION OF PARTICULAR EMBODIMENTS

Turning first to FIG. 1, the trickle emitter and flow retarder as a whole is indicated by the numeral 10. It is fixed on a plastic or like conduit indicated by the numeral 70. The inlet into the interior of the trickle emitter is formed by a spigot 3. A second spigot 3' serves to stabilize the device 10 on the conduit 7. Both these spigots are inserted into appropriately positioned holes in the conduit. The outlet from the emitter is indicated by the arrow A.

The build up of the emitter and the manner in which its parts are connected with one another will become clear from the following:

The exploded view of FIG. 2 shows the two parts of the emitter, one part indicated by 1 which will be referred to as the female part and a second part indicated by the numeral 2 will be referred to as the male part. The male part 2 has an inlet spigot indicated by the numeral 3 which has narrow inlet openings 4 merging into a wider bore 5. The inlet openings 4 have the shape of an elongated rectangle or slot, as seen from FIG. 2a. Their width is a submultiple of their length, thus the total inlet area permits the entry of a considerable quantity of water, but stops grains of sand or other foreign bodies the dimensions of which are larger than the width of an entry slot 4. The bore 5 leads into a labyrinth or maze indicated by the numeral 7, this maze being shown in FIG. 3 in a plan view. As can be seen the maze is constituted by a number of circular ribs 8 rising from the bottom of male part 2. Between these ribs a continuous path 9 is formed in which the flow of water occurs. The bore 5 leads into the said path 9. Incidentally, the ribs are provided with laterally projecting short extension $a$ which force the flow to perform bends and curves, for a purpose to be described later. As can be seen in the lower portion of FIG. 2 part 2 has circumferential rib 11 at its uppermost edge. The rib 11 is skived off at 12 and downwardly at 13.

The female part 1 has at the underside of its top wall ribs which constitute a maze similar to the one described in connection with the male part and an outlet 14 establishing communication between the maze and the open. Within the circumferential wall of the female part indicated by the numeral 1a there is formed a circumferential groove 15 which in its upper part is strictly cylindrical while its lower part 15a is truncated, thus forming a phase with an oblique surface 15a. The maze formed on the male part 2 and the one formed in the female part 1 are partitioned from one another by a membrane 16 inserted into part 1 and held therein clampingly by the subsequently inserted part 2. In the center of the membrane 16 is provided an opening 17.

The thickness of the membrane and of the jutting rib 11 together is slightly more than the total width of the groove 15. This is indicated in FIG. 2 by the letters X and Y, X being greater than Y.

The membrane is of slightly yielding and elastic material. The male part 2 with its surrounding rib 11 is forcibly introduced into the open side of the female part 1, the rib 11 passing over the inwardly extending rib 18 which extends around the open side of part 1. After having been forced through the opening defined by rib 18 the rib 11 snaps over the confines of rib 18 and enters into the groove 15. While this occurs the membrane 16 is compressed and due to its elasticity it exerts an axial pressure onto part 2 forcing the rib with its shoulder 13 against the phase 15a of groove 15. In this way the male part is securely kept within the female part and the connection easily and quickly obtained is tight.

The emitter shown in FIGS. 4 and illustrated by FIG. 5 comprises two mating parts 30 and 31.

Here both parts have at their circumference a rim consisting of four claw profiled portions 32 which are regularly spaced from one another. The distances or gaps 34 between the rim portions 32 are equal to the width of these portions. Each portion 32 has at its inwardly directed side a groove 33. The two parts are provided at their inwardly facing sides with a spirally extending rib 35, as described in connection with FIGS. 2 and 3. In each part inlet (or outlet) spigots 36 and 37 - 38 are provided. A membrane may be held clampingly between the two parts, and have an aperture establishing communication between the spaces at opposite sides of the membrane, as described in connection with FIG. 2.

To assemble an emitter from the two parts 30 - 31, the two parts are placed against one another with the portions 32 of one part in register with gaps 34 of the other part and by application of pressure the grooves 33 of the portions 32 of one part are made to engage the edge of the opposite part within the gap 34. Again axial pressure on both parts acts to hold the two parts together.

There are known emitters of this type which consist of two interconnecting parts, but in those cases the two parts are either screwed into one another or connected by a bayonet connection. Such connections, though effective, are more costly to produce and therefore increase the initial cost of the flow emitters. The fusing together which is mentioned in may copending application Ser. No. 561,978 is also more costly than the press fitting. Accommodating a screw or bayonet closure considerably increases the overall dimensions of the emitter, which means an expenditure in material at manufacturing the device and furthermore in many cases renders the placing of the device on a conducting hose inconvenient and difficult due to the size of the device.

The interfitting connection between the two mating parts which constitutes the main feature of the present invention may of course be employed with quite differently designed flow conduits or conducting paths or mazes within the emitter.

The emitter described and shown in the drawings may be subject to changes without departing from the scope of the invention. So e.g. the construction according to FIGS. 4 and 5 may have three or even five claw profiled portions, instead of the four shown in the drawings.

The membrane partitioning the internal space of the emitter into two chambers may be dispended with and - if desired - a packing ring may be inserted. On the other hand more than two chambers may be created by employing the two main parts as described and holding between them - clampingly - a plate (or plates) which on both sides has a rib forming a maze, as described.

What is claimed is:

1. A plate-like drip or trickle emitter comprising two matingly connected disc-shaped parts press-fitted into one another, said parts together forming, at least in part from interior surfaces of both of said parts, a tortuous path for a flow of liquid in the interior thereof, at least one inlet provided at one end of said path and at least one outlet at the opposite end of said path, urging means being provided for urging contacting regions of said two disc-shaped parts into forced intimate contact with one another in the axial direction, a first of said parts having an all-round extending ribe at the inside of the circumferential wall thereof which forms a groove between said rib and a flat wall of said first part, said groove being partly of cylindrical and partly of truncated cone cross-section, and the other of said parts having a circumferential rib around the outside of the circumferential wall thereof whose cross-section corresponds to that of said groove.

2. A plate-like drip or trickle emitter in accordance with claim 1, wherein one of said mating parts has a shoulder at the circumference thereof and the other of said mating parts has an oppositely directed shoulder, and wherein said urging means comprises a membrane having elasticity extending over substantially the entire area of the interior of said parts and dividing the assembled parts into two chambers, said membrane being clampingly held between the said two parts and exerting -- due to the elasticity thereof -- pressure onto said confronting shoulders.

3. A plate-like drip or trickle emitter in accordance with claim 1, wherein said inlet has an entrance port therein in the form of an elongated slot.

4. A plate-like drip or trickle emitter in accordance with claim 1 wherein said urging means comprises a membrane having elasticity extending over substantially the entire area of the interior of said parts and dividing the assembled parts into two chambers and wherein the total thickness of said second part together with said membrane is greater than the width of said groove formed in said first part, thereby allowing said membrane to be clampingly held between the said two parts and to exert pressure -- due to the elasticity thereof -- onto said assembled parts.

5. A plate-like drip or trickle emitter comprising two matingly connected disc-shaped parts press-fitted into one another, said parts together forming, at least in part from interior surfaces of both of said parts, a tortuous path for a flow of liquid in the interior thereof, at least one inlet provided at one end of said path and at least one outlet at the opposite end of said path, and wherein each of said mating parts have a plurality of claw profiled portions regularly spaced from one another with the distance therebetween substantially equal to the width of each portion, whereby when assembled the claw profiled portions of each part register with the gaps of the other part and grasp the outer flat surface of the other part.

6. A plate-like drip or trickle emitter in accordance with claim 5, further including means for urging the contacting regions of said two disc-shaped parts into forced intimate contact with one another in the axial direction.

7. A plate-like drip or trickle emitter in accordance with claim 6, wherein said urging means comprises a membrane having elasticity extending over substantially the entire area of the interior of said parts and dividing the assembled parts into two chambers, said membrane being clampingly held between the said two parts and exerting -- due to the elasticity thereof -- pressure between the portions of said two parts.

\* \* \* \* \*